United States Patent
Flores et al.

(10) Patent No.: US 7,486,785 B2
(45) Date of Patent: Feb. 3, 2009

(54) METHOD FOR CUSTOMER RECOGNITION AND MANAGEMENT

(75) Inventors: Romelia H. Flores, Keller, TX (US); Janice M. Taylor, Lewisville, TX (US); Keith A. Thuerk, Southlake, TX (US)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 10/212,326

(22) Filed: Aug. 5, 2002

(65) Prior Publication Data

US 2004/0022384 A1 Feb. 5, 2004

(51) Int. Cl.
*H04M 3/00* (2006.01)

(52) U.S. Cl. .......................... 379/265.02; 379/265.01; 379/265.09

(58) Field of Classification Search ............ 379/265.11, 379/265.12, 266.01, 93.01, 110.01, 207.13, 379/265.01, 265.02, 265.09
See application file for complete search history.

(56) References Cited

U.S. PATENT DOCUMENTS

| | | | |
|---|---|---|---|
| 5,872,834 A * | 2/1999 | Teitelbaum | 379/93.03 |
| 6,044,146 A * | 3/2000 | Gisby et al. | 379/266.02 |
| 6,104,913 A | 8/2000 | McAllister | 455/41 |
| 6,154,727 A | 11/2000 | Karp et al. | 705/3 |
| 6,170,011 B1 * | 1/2001 | Macleod Beck et al. | 709/224 |
| 6,213,391 B1 | 4/2001 | Lewis | 235/380 |
| 6,327,347 B1 * | 12/2001 | Gutzmann | 379/88.02 |
| 6,600,821 B1 * | 7/2003 | Chan et al. | 379/265.07 |
| 6,665,396 B1 * | 12/2003 | Khouri et al. | 379/266.01 |
| 6,801,620 B2 * | 10/2004 | Smith et al. | 379/266.01 |
| 2003/0108187 A1 * | 6/2003 | Brown et al. | 379/266.03 |
| 2004/0162773 A1 * | 8/2004 | Del Rey et al. | 705/36 |

OTHER PUBLICATIONS

S. H. Maes, et al., Conversational Speech Biometrics, *E-Commerce Agents*, LNAI 2033, pp. 166-179, (2001).

* cited by examiner

*Primary Examiner*—Ahmad F. Matar
*Assistant Examiner*—Karen L Le
(74) *Attorney, Agent, or Firm*—Akerman Senterfitt

(57) ABSTRACT

A method for handling a customer call in a customer relationship management system can include, responsive to receiving a telephone call from a caller, receiving caller biometric information via the telephone call which uniquely identifies the caller. The caller biometric information can be compared with biometric information profiles to determine an identity of the caller. The telephone call can be transferred to a telephone number according to the identity of the caller.

12 Claims, 2 Drawing Sheets

METHOD FOR CUSTOMER RECOGNITION AND MANAGEMENT

BACKGROUND OF THE INVENTION

1. Technical Field

The present invention relates to the field of electronic business (e-Business), and more particularly, to a method for improved customer recognition and call management.

2. Description of the Related Art

The pervasiveness of the Internet has allowed companies to exploit electronic communications to engage in what is commonly known as e-business activities with their customers. E-business involves conducting business on the Internet. As such, e-business includes not only the buying and selling of goods and services, but also servicing customers and collaborating with business partners. To accommodate this vast range of activities, companies typically establish a customer relationship management (CRM) system.

A CRM system can include a suite of products which can provide the infrastructure necessary for tracking and supporting customer related activities. CRM systems can be used to establish a detailed understanding of customer traits and characteristics, which can be used to guide customer interactions and tailor products and service offerings. To that end, CRM systems typically gather different forms of customer information to establish customer profiles. If the CRM system is equipped with an interactive voice response unit and a switching system, the CRM system can be used with the telephony equipment to aid in providing automated call handling and interactive caller support.

Many businesses have attempted to integrate call processing with customer profiles so that when a service agent receives a call from a customer, the customer's profile is readily available to the service agent. Regardless of the level of integration between the call processing system and the CRM system, however, for a CRM system to function properly, the caller first must be identified. Typically, the caller must key in or speak a password or other identifier through a telephony interface. The received customer call then can be matched to a caller profile. Because most conventional CRM systems are designed to pose a minimal bother to callers, frequently such systems ask for minimal identifying information. Additionally, many users prefer to use short codes or other identifiers which can be easily remembered. Taken together, the use of minimal identifying information and predictable codes may lead to a CRM system that is easily compromised. Further compromises in security can arise when third parties overhear a customer speaking or see a customer key in a password and/or account number.

To date, however, the alternatives have included asking the customer to be wary about who may be listening or watching and querying the customer for additional information. Being wary is not a foolproof solution and querying the customer for additional information often occurs at the cost of irritating the customer. Other automated systems require customers to provide identifying information at several points within a given telephone call. Although this can enhance security, customers can become impatient with repetitive and redundant production of personal and/or identifying information.

In consequence, unauthorized users may gain access to an individual's sensitive information through a conventional CRM system. Once access has been obtained, unauthorized users can initiate harmful and/or illegal acts such as identity theft. Still, the mere act of impersonating another customer when interacting with a CRM system can significantly impact the victim's customer profile with a given business. For example, if the impersonator is argumentative or files a grievance and the customer profile is updated to reflect such incidents, the actual customer may be treated differently during a subsequent telephone call to the business.

SUMMARY OF THE INVENTION

The invention disclosed herein provides a solution for handling calls in a customer relationship management (CRM) system. In particular, the present invention provides a secure method of identifying customers (callers) accessing a CRM system through a telephony interface. The present invention relies upon biometric information rather than caller entered codes and passwords to identify callers. Accordingly, call routing and other automated interactive voice functions can be performed based upon the identity of a caller as determined by the caller's biometric information.

One aspect of the present invention can include a method for handling a customer call in a CRM system. The method can include, responsive to receiving a telephone call from a caller, receiving caller biometric information uniquely identifying the caller via the telephone call. For example, the received telephone call can be established using a packet data enabled telephone over a packet-based network such as an Internet protocol (IP), frame relay, or asynchronous transfer mode (ATM) network. Biometric information can include, but is not limited to, retinal scan information, deoxyribonucleic acid information, voice information, finger print information, or any other biometric information capable of identifying an individual.

The caller biometric information can be compared with biometric information profiles to determine an identity of the caller. The telephone call can be transferred to a telephone number according to the identity of the caller. For example, the telephone number can be associated with a service agent having a customer relationship expertise relating to the caller's identity.

Another embodiment of the present invention can include determining customer relationship attributes associated with the identity of the caller, assigning a priority to the telephone call according to the customer relationship attributes, and placing the received call in a call queue. The location of the call within the call queue can be determined by the assigned priority. For example, the transfer of a different telephone call having a lower priority than the priority of the received telephone call can be delayed. Alternatively, the different telephone call can be placed in the queue behind other telephone calls received after the different telephone call but having a higher priority.

The caller can be queried for additional information such as a service type for which the caller has called. The call can be transferred to a telephone number which also is associated with the caller specified service type. According to another embodiment of the present invention, the method can include recalling caller relationship attributes associated with the identity of the caller and providing at least a portion of the caller relationship attributes to a computer system associated with the telephone number, thereby making caller information available to service agents to facilitate caller service. The call can be transferred according to the caller relationship attributes.

BRIEF DESCRIPTION OF THE DRAWINGS

There are presently shown in the drawings embodiments which are presently preferred, it being understood, however, that the invention is not so limited to the precise arrangements and instrumentalities shown.

DETAILED DESCRIPTION OF THE INVENTION

The invention disclosed herein provides a solution for handling calls in a customer relationship management (CRM) system. In particular, the present invention relies upon biometric information rather than caller entered codes and passwords to identify callers. Accordingly, call routing and other automated and interactive voice functions can be performed based upon the identity of a caller as determined by the callers' biometric information and caller profiles. The caller profiles can specify a variety of additional customer relationship attributes which also can be used to specify call routing and caller access to automated and interactive voice functions.

Figure 1:
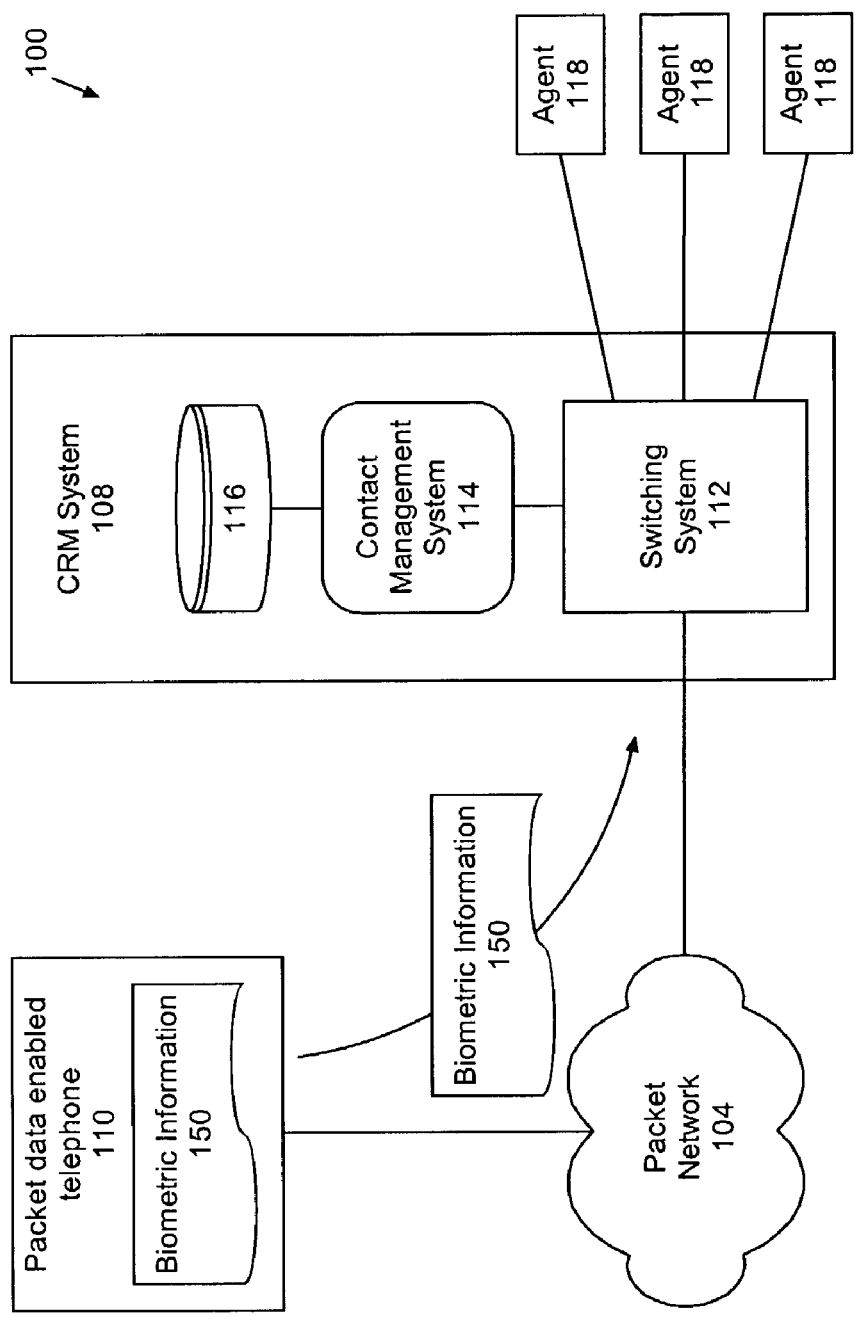
FIG. 1 is a schematic diagram illustrating a call management system in accordance with the inventive arrangements disclosed herein.

FIG. 1 is a schematic diagram illustrating a call management system 100 in accordance with the inventive arrangements disclosed herein. As shown in FIG. 1, the system 100 can include a CRM system 108 which can be accessed by various callers using a packet data enabled (PDE) telephone 110 through a packet network 104. Using the PDE telephone 110, a caller can initiate voice communications with the CRM system 108. The term "PDE telephone", as used herein, can include a software client executing on a computer system, a hardware device, or any other device configured to send voice communications over a packet-switched network, whether the device is linked to the packet-switched network via a wired connection or a wireless connection. For example, such devices are commonly referred to as having Voice over Internet protocol (VoIP) capability, IP telephony capability, or Voice Over Packet (VOP) capability, and can send data over IP networks, frame relay networks, and asynchronous transfer mode (ATM) networks. Accordingly, the packet network 104 can be any packet-based network including, but not limited to, IP, frame relay, and ATM networks.

In any case, the PDE telephone 110 can include one or more applications which can support the exchange of biometric information 150. For example, the PDE telephone 110 can include one or more Java applications configured to exchange biometric information 150 which can be annotated with a suitable markup language such as extensible markup language (XML). The biometric information 150 can include, but is not limited to biological information such as retinal scans, fingerprint information, deoxyribonucleic acid (DNA) information, voice print information, or any other biological information which can uniquely identify a caller. The biometric information 150 can be included within a memory store of the PDE telephone 110. Alternatively, the biometric information can be determined as needed. For example, the PDE telephone 110 can include, or be communicatively linked with, one or more biometric information sensors such as fingerprint sensing pads, retinal scanners, microphones, and the like which can capture and encode the biometric information 150. Accordingly, at some point prior to a call and/or during the call, a caller can place a finger on the fingerprint sensing pad, or look into a retinal scanner so that the biometric information can be captured. Notably, such an arrangement would allow more than one caller to utilize the PDE telephone 110 for sending biometric information 150.

It should be appreciated, however, that the PDE telephone 110 can include multiple sets of biometric information 150. In that case, a caller using the PDE telephone 110 can identify himself or herself to the PDE telephone 110 so that the correct set of biometric information 150 can be identified and used in subsequent telephony transactions with the CRM system 108. Notably, the caller can be identified by providing a code and/or providing biometric information to be matched with a stored biometric information profile.

The CRM system 108 can receive calls initiated from the PDE telephone 110 via the packet network 104. The CRM system 108 can include a switching system 112, a contact management system 114, and a caller database 116. The switching system 112 can include an appropriate interface to the packet network 104. Notably, the switching system 112 also can include a suitable interface to the public switched telephone network (PSTN) or other circuit switched telephony equipment if necessary. Regardless, the switching system 112 can connect and/or transfer calls to the interactive voice response unit 114 and one or more of the service agents 118.

Notably, depending upon the particular telephony system used by a business organization, the CRM 108 can be implemented as a packet switched telephony system, a circuit switched telephony system, or any combination thereof. That is, if the telephony system of a particular business organization is implemented over a packet data network, then communications between the PDE telephone 110 and the CRM 108, as well as the various agents 118 need not be converted for use with a conventional circuit switched telephony system. Accordingly, the switching system 112 can be implemented through software executing within a computer system and/or server. If, however, the telephony system of a business organization utilizes conventional circuit switched technology, then appropriate interfaces, for example a gateway or other packet switched/circuit switched interface can be used as well as a conventional circuit switched switching system 112.

The contact management system 114 can execute one or more of a variety of interactive voice response applications for processing caller requests, gathering caller information, and providing audio prompts and requested information. The contact management system 114 can query the caller for the type of service the caller wishes to access. For example, the contact management system 114 can be implemented using an interactive voice response (IVR) unit. The contact management system 114 further can manage and maintain caller profiles stored within the caller database 116. The caller profiles can specify biometric information capable of uniquely identifying and distinguishing each caller. The caller profiles further can specify relationship management attributes specifying information such as a caller's purchase history, contact information, personal information or demographic information which may indicate the caller's purchasing behavior. Notably, the biometric information corresponding to each caller and caller profile can be stored in any of a variety of formats. For example, the biometric information can be stored within a biometric information profile specified by a corresponding caller profile, or can be specified by a biometric information profile which can be separate, but associated with a corresponding caller profile.

In operation, a caller can place a call to the CRM system 108. For example, the call can be routed through the packet network 104 to a network address corresponding to the CRM system 108. As the call is established, or subsequent to establishing the call, the PDE telephone 110 can provide biometric information 150 which uniquely identifies the caller. For example, as the PDE telephone 110 is network enabled, the PDE telephone 110 can respond to caller identification queries received from the network device to which the PDE telephone 110 is connecting during or after call set up, and automatically respond with stored biometric information 150 associated with the caller. Still, the biometric information 150 can be provided automatically during or after the establishment of a telephone call, without first being prompted.

Alternatively, the PDE telephone 110 can determine that biometric information 150 is required to complete the call and notify the caller that the caller needs to provide biometric information. For example, the PDE telephone 110 can provide an audio, visual, and/or a text prompt instructing the user that biometric information is required. The caller can respond by granting permission to the PDE telephone 110 to send stored biometric information 150 stored therein, by providing the biometric information 150 through a suitable biometric information sensor, or by providing a reference to an external storage containing the biometric information. For example, the caller can swipe a card through a card reader communicatively linked to the PDE telephone 110 or insert a memory device containing the biometric information 150 into a receiving slot or port of the PDE telephone 110. Still, the call can be forwarded by the switching system 112 to the contact management system 114 which can provide audio notifications to the caller requesting biometric information 150.

In any case, the biometric information 150 can be provided to the contact management system 114 via the packet network 104 and the switching system 112. The received biometric information can be matched to a caller profile stored in the database 116. The caller profiles can specify, at least in part, the proper routing of the call. For example, the caller profile can specify a particular service agent 118, or a set of service agents 118 having a particular customer relations skill suited to dealing with the caller as determined by the identified caller profile. Alternatively, the caller can be queried as to the type of service the caller is trying to access. Accordingly, the caller specified service type can be used in combination with the caller profile to properly route the received call to a particular service agent 118.

Notably, the contact management system 114 can be configured to prioritize the handling of a call based on the identity of a caller or customer relationship attributes specified by the caller profile. For example, calls can be processed and transferred according to customer relationship attributes such as net worth, length of time the caller has been a customer, the number of complaints or grievances filed by the caller, or other demographic information. Thus, calls can be queued and ordered for answering according to the caller profile. For instance, callers can be transferred to specialized service agents according to a customer loyalty parameter, a priority parameter, or other parameters or attributes of the caller profile. Thus, a customer having filed many grievances can be transferred to a service agent 118 having special training for dealing with irritated customers. A caller having a high net worth can be transferred to a service agent having experience with particular financial products available only to individuals having a minimum net worth. In any case, as the call is transferred to the appropriate service agent 118, the caller's profile also can be transferred to a computer terminal used by the service agent 118 to which the call was transferred.

Figure 2:
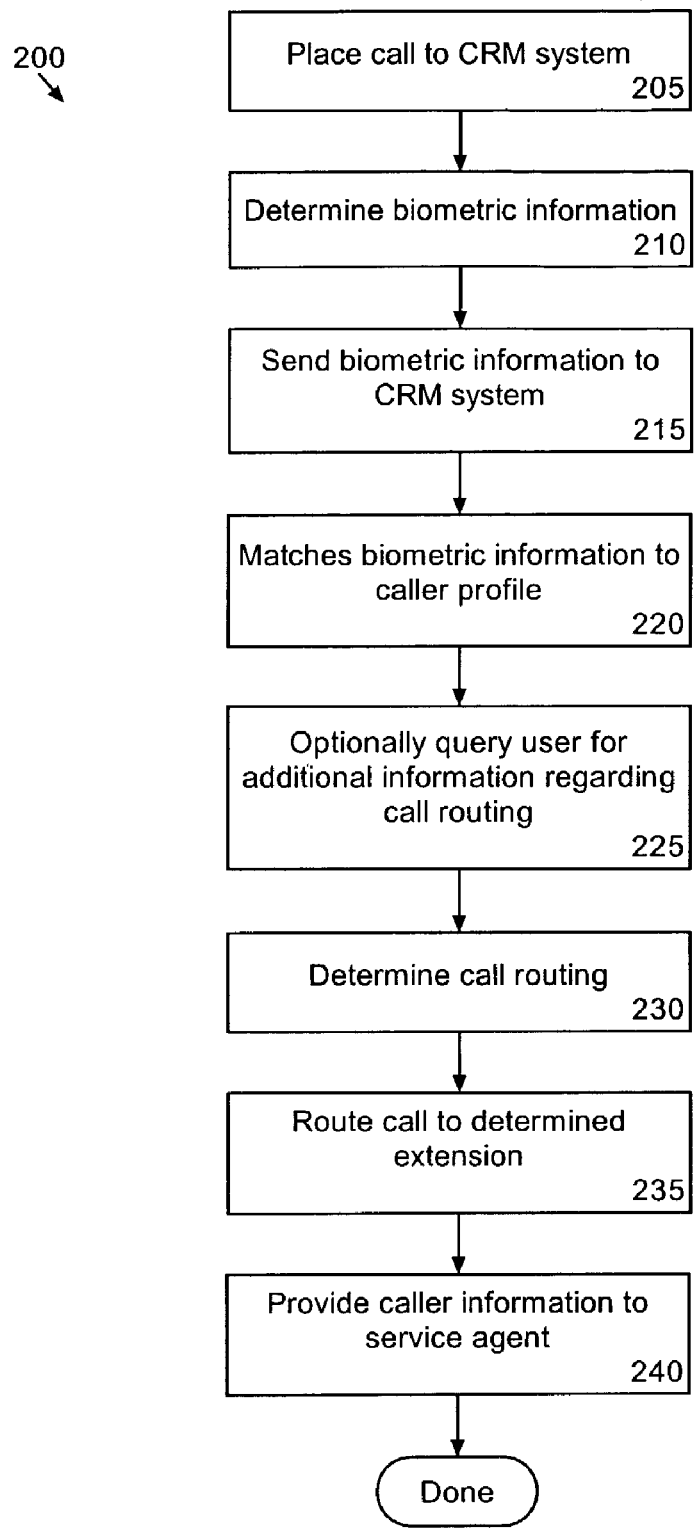
FIG. 2 is a flow chart illustrating a method of routing customer calls according to received biometric information.

FIG. 2 is a flow chart illustrating a method 200 of routing customer calls according to received biometric information. The method 200 can begin in step 205 where a caller initiates a call to the CRM system. For example, the caller can dial a telephone number which can be translated to a corresponding network address. The dialed telephone number can be provided to the CRM system so that if more than one telephone number is associated with the CRM system, the CRM system can route the received call to an appropriate voice response application associated with the dialed telephone number.

In step 210, the caller's biometric information can be determined. As mentioned, the biometric information can be recalled from memory or can be determined through the use of one or more different biometric sensors. In the event the PDE telephone has more than one set of biometric information stored in memory, the biometric information corresponding to the present caller can be identified. In step 215, the biometric information can be sent to the CRM system. As noted, the biometric information can be sent responsive to a request from the device to which the telephone call was directed, automatically without receiving a request, and/or with or without user permission or intervention. The CRM system can match the biometric information received from the caller to biometric information specified within the various biometric information and/or caller profiles stored within the CRM system in step 220. Accordingly, the caller can be authenticated thereby increasing system security through the use of biometric information.

In step 225, depending upon the implementation of the telephony system and contact management system of the CRM system, the CRM system optionally can query the user for additional information. For example, the CRM system can ask the user to specify a purpose for the call by selecting an option from a voice response menu, specify a department or location to which the caller desires to be transferred, specify information which the caller desires, and the like.

In step 230, the CRM system can determine how the received call is to be handled. In particular, the CRM system can determine one or more possible telephone numbers to which the call can be transferred. The term "telephone number", as used herein, can include an internal routing number such as an extension as well as an external telephone number and any programmable digits or characters to be used in dialing the number, whether internal or external. The call routing determination can be made with reference to one or more attributes specified within the caller profile, as well as any caller provided information from step 225. Notably, the call routing can be determined directly according to a caller's identity as determined by the provided biometric information. For example, the matched biometric information can be associated with a call transfer attribute corresponding to a particular telephone number and/or service area.

In step 235, the call can be transferred to a telephone number as determined in step 230. In step 240, the caller profile can be provided to a computer system and/or terminal corresponding to the telephone number to which the call was transferred. Accordingly, the service agent receiving the call can have the benefit of viewing the caller profile to better serve the caller. Notably, the biometric information can be filtered or withheld from the service agent, as can any other data items of the caller profile which may not be necessary for the service agent to service the caller.

Although the transfer of the call and the transfer of caller information to a service agent computer system are illustrated as separate steps, it should be appreciated that such information can be provided at substantially the same time. For example, if both the call and caller information are provided over a packet-switched network, the call and the caller information can be routed to the proper service agent and service agent computer system automatically upon identifying the call destination. Alternatively, if the call is completed over a conventional voice circuit, the forwarding of the call can be coordinated with the forwarding of the caller information. In any case, the service agent can receive both the call and the caller profile at substantially the same time, such that the service agent need not perform a separate search for caller information after receiving the customer call. Thus, caller identification, call routing, as well as caller profile recall and routing can be performed automatically according to received biometric information.

It should be appreciated that the particular ordering of the steps specified in the method 200 of FIG. 2 is not intended as a limitation on the invention. As discussed, biometric information can be automatically provided from an PDE telephone or can be provided at particular times when queried to do so. Still, the biometric information can be provided after a caller provides the biometric information. Thus, the caller can be queried, if at all, regarding type of service or reason for a call before or after biometric information is sent.

The present invention can be realized in hardware, software, or a combination of hardware and software. The present invention can be realized in a centralized fashion in one computer system, or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The present invention also can be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention can be embodied in other forms without departing from the spirit or essential attributes thereof. Accordingly, reference should be made to the following claims, rather than to the foregoing specification, as indicating the scope of the invention.

What is claimed is:

1. A method for handling a customer call, the method comprising:
   receiving a telephone call from a caller;
   identifying the caller based on caller biometric information associated with the caller, caller identification being made with a packet data enabled (PDE) telephone used by the caller and being made prior to the telephone call from the caller being received by a customer relationship management system including a switching system, a contact management system, and a caller database containing caller profiles;
   receiving the telephone call in the customer relationship management system accessible through a communication network to which said customer relationship management system is linked, said call conveying the caller biometric information uniquely identifying said caller, and said customer relationship management system being uniquely associated with a business organization called by said caller;
   comparing said caller biometric information with biometric information stored in a plurality of biometric information profiles, each of which is separate from, but associated with a corresponding caller profile, to identify said caller and to retrieve one of said caller profiles corresponding to said caller, wherein each of said caller profiles includes a plurality of data items, and wherein at least one of said data items includes a stored customer value based upon customer relationship attributes of the caller, the customer relationship attributes being obtained from previous customer calls and previous interactions with other channels associated with the business organization, the customer value defining a net worth of a customer relationship between the caller and the business organization;
   assigning a priority to said telephone call based on the defined customer value stored in said caller profile corresponding to said identified caller; and
   transferring said telephone call to a service agent at a predetermined telephone number according to said caller profile corresponding to said identified caller.

2. The method of claim 1, further comprising:
   placing said received call in a call queue, wherein a location of said received call within said call queue is determined by said assigned priority.

3. The method of claim 2, further comprising:
   delaying the transfer of a different telephone call having a lower priority than said priority of said received telephone call.

4. The method of claim 1, wherein said telephone number is associated with a service agent having a customer relationship expertise relating to said identified caller.

5. The method of claim 1, further comprising:
   querying said identified caller for a service type; and
   transferring said call to said telephone number, wherein said telephone number is associated with said service type.

6. The method according to claim 1, wherein said biometric information is selected from the group consisting of retinal scan information, deoxyribonucleic acid information, voice information, and finger print information.

7. A computer-readable storage medium, having stored thereon a computer program having a plurality of code sections, said code sections executable by a computer for causing the computer to perform the steps of:
   receiving a telephone call from a caller;
   identifying the caller based on caller biometric information associated with the caller, caller identification being made with a packet data enabled (PDE) telephone used by the caller and being made prior to the telephone call from the caller being received by a customer relationship management system including a switching system, a contact management system, and a caller database containing caller profiles;
   receiving the telephone call in the customer relationship management system accessible through a communication network to which said customer relationship management system is linked, said call conveying caller biometric information uniquely identifying said caller, and said customer relationship management system being uniquely associated with a business organization called by said caller;
   comparing said caller biometric information with biometric information stored in a plurality of biometric information profiles, each of which is separate from, but associated with a corresponding caller profile, to identify said caller and to retrieve one of said caller profiles corresponding to said caller, wherein each of said caller profiles includes a plurality of data items, and wherein at least one of said data items includes a stored customer value based upon customer relationship attributes of the caller, the customer relationship attributes being obtained from previous customer calls and previous interactions with other channels associated with the business organization, the customer value defining a net worth of a customer relationship between the caller and the business organization;

assigning a priority to said telephone call based on the defined customer value stored in said caller profile corresponding to said identified caller; and transferring said telephone call and said filtered caller profile to a service agent at a predetermined telephone number according to said caller profile corresponding to said identified caller.

8. The computer-readable storage medium of claim 7, further comprising:

placing said received call in a call queue, wherein a location of said received call within said call queue is determined by said assigned priority.

9. The computer-readable storage medium of claim 8, further comprising:

delaying the transfer of a different telephone call having a lower priority than said priority of said received telephone call.

10. The computer-readable storage medium of claim 7, wherein said telephone number is associated with a service agent having a customer relationship expertise relating to said identified caller.

11. The computer-readable storage medium of claim 7, further comprising:

querying said identified caller for a service type; and transferring said call to said telephone number, wherein said telephone number is associated with said service type.

12. The computer-readable storage medium of claim 7, wherein said biometric information is selected from the group consisting of retinal scan information, deoxyribonucleic acid information, voice information, and finger print information.

* * * * *